United States Patent
McDowell et al.

(10) Patent No.: US 9,628,755 B2
(45) Date of Patent: Apr. 18, 2017

(54) AUTOMATICALLY TRACKING USER MOVEMENT IN A VIDEO CHAT APPLICATION

(75) Inventors: Brian McDowell, Woodinville, WA (US); Darren Apfel, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 122 days.

(21) Appl. No.: 12/904,980

(22) Filed: Oct. 14, 2010

(65) Prior Publication Data

US 2012/0092445 A1 Apr. 19, 2012

(51) Int. Cl.
*H04N 7/01* (2006.01)
*G06K 9/00* (2006.01)
(Continued)

(52) U.S. Cl.
CPC ......... *H04N 7/147* (2013.01); *G06K 9/00201* (2013.01); *G06K 9/00261* (2013.01);
(Continued)

(58) Field of Classification Search
USPC ................... 348/14.01, 14.04, 14.08, 14.16
See application file for complete search history.

(56) References Cited

U.S. PATENT DOCUMENTS 4,941,045 A * 7/1990 Birch .................... H04N 7/012
348/409.1
6,005,548 A * 12/1999 Latypov .................. A63F 13/00
345/156
(Continued)

FOREIGN PATENT DOCUMENTS

CN 1774065 A 5/2006
CN 1794264 A 6/2006
(Continued)

OTHER PUBLICATIONS

Yong Rui, Anoop Gupta, Jonathan Grudin, Liwei He: Automating lecture capture and broadcast: technology and videography Multimedia Systems (Springer-Verlag 2004), Digital Object Identifier (DOI) 10.1007/s00530-004-0132-9.*
(Continued)

*Primary Examiner* — Duc Nguyen
*Assistant Examiner* — Yogeshkumar Patel
(74) *Attorney, Agent, or Firm* — Vierra Magen Marcus LLP

(57) ABSTRACT

A system for automatically tracking movement of a user participating in a video chat application executing in a computing device is disclosed. A capture device connected to the computing device captures a user in a field of view of the capture device and identifies a sub-frame of pixels identifying a position of the head, neck and shoulders of the user in a capture frame of a capture area. The sub-frame of pixels is displayed to a remote user at a remote computing system who is participating in the video chat application with the user. The capture device automatically tracks the position of the head, neck and shoulders of the user as the user moves to a next location within the capture area. A next sub-frame of pixels identifying a position of the head, neck and shoulders of the user in the next location is identified and displayed to the remote user at the remote computing device.

20 Claims, 10 Drawing Sheets

(51) Int. Cl.
*G06K 9/20* (2006.01)
*G06T 7/20* (2006.01)
*H04N 13/02* (2006.01)
*H04N 7/14* (2006.01)
*G06T 7/246* (2017.01)

(52) U.S. Cl.
CPC ............ *G06K 9/2036* (2013.01); *G06T 7/204* (2013.01); *G06T 7/248* (2017.01); *A63F 2300/572* (2013.01); *G06T 2207/10021* (2013.01); *G06T 2207/10028* (2013.01); *G06T 2207/30196* (2013.01); *H04N 13/0203* (2013.01)

(56) References Cited

U.S. PATENT DOCUMENTS

| | | | | |
|---|---|---|---|---|
| 6,058,201 | A * | 5/2000 | Sikes | B41F 33/0045 250/559.07 |
| 6,499,402 | B1 * | 12/2002 | Sikes | B41F 13/12 101/171 |
| 6,850,265 | B1 | 2/2005 | Strubbe et al. | |
| 7,003,135 | B2 * | 2/2006 | Hsieh | G06T 7/2033 382/103 |
| 7,149,367 | B2 * | 12/2006 | Cutler | G03B 37/00 345/661 |
| 7,260,278 | B2 * | 8/2007 | Zhang | G06F 3/017 382/165 |
| 7,298,392 | B2 * | 11/2007 | Cutler | H04N 7/142 348/36 |
| 7,349,005 | B2 | 3/2008 | Rui et al. | |
| 7,379,559 | B2 * | 5/2008 | Wallace | G06K 9/00248 348/113 |
| 7,555,141 | B2 * | 6/2009 | Mori | 382/103 |
| 7,706,576 | B1 | 4/2010 | Beck et al. | |
| 7,885,463 | B2 * | 2/2011 | Zhang | G06K 9/38 382/173 |
| 8,194,117 | B2 * | 6/2012 | Hetherington et al. | 348/14.12 |
| 8,717,355 | B2 * | 5/2014 | Newton | G06T 15/503 345/421 |
| 8,854,364 | B1 * | 10/2014 | Voorhies | G06T 15/40 345/419 |
| 8,854,428 | B2 * | 10/2014 | Suh | H04N 13/0022 348/42 |
| 8,867,820 | B2 * | 10/2014 | Peeper | G06T 7/0081 348/42 |
| 9,147,260 | B2 * | 9/2015 | Hampapur | G06T 7/2006 |
| 2002/0141637 | A1 * | 10/2002 | Brodsky | G06K 9/00771 382/165 |
| 2003/0011618 | A1 * | 1/2003 | Deering | G06T 11/001 345/613 |
| 2003/0142099 | A1 * | 7/2003 | Deering | G09G 5/391 345/531 |
| 2004/0263611 | A1 * | 12/2004 | Cutler | H04N 7/142 348/36 |
| 2005/0157204 | A1 * | 7/2005 | Marks | H04N 5/272 348/370 |
| 2006/0126894 | A1 * | 6/2006 | Mori | H04N 7/142 382/103 |
| 2006/0227862 | A1 * | 10/2006 | Campbell | G06K 9/00778 375/240 |
| 2006/0277571 | A1 * | 12/2006 | Marks | A63F 13/00 725/37 |
| 2007/0002130 | A1 | 1/2007 | Hartkop | |
| 2007/0024614 | A1 * | 2/2007 | Tam | G06T 7/0067 345/419 |
| 2007/0035530 | A1 * | 2/2007 | Van Geest | G06T 15/20 345/204 |
| 2007/0103704 | A1 * | 5/2007 | Chou | H04N 1/3876 358/1.9 |
| 2007/0279494 | A1 * | 12/2007 | Aman | G01S 3/7864 348/169 |
| 2007/0285419 | A1 * | 12/2007 | Givon | G06K 9/3216 345/420 |
| 2009/0040289 | A1 | 2/2009 | Hetherington et al. | |
| 2009/0122146 | A1 * | 5/2009 | Zalewski | A63F 13/06 348/169 |
| 2009/0183193 | A1 * | 7/2009 | Miller, IV | G06F 3/017 725/10 |
| 2009/0219379 | A1 * | 9/2009 | Rossato | G06T 7/0083 348/14.01 |
| 2009/0279663 | A1 * | 11/2009 | Miyamoto | A61B 6/00 378/62 |
| 2009/0315974 | A1 | 12/2009 | Matthews | |
| 2010/0045783 | A1 * | 2/2010 | State | G02B 27/017 348/53 |
| 2010/0123770 | A1 | 5/2010 | Friel et al. | |
| 2010/0135580 | A1 | 6/2010 | Liu | |
| 2010/0150403 | A1 * | 6/2010 | Cavallaro | G06K 9/00778 382/107 |
| 2010/0295922 | A1 * | 11/2010 | Cheung | H04N 19/176 348/42 |
| 2011/0063440 | A1 | 3/2011 | Neustaedter et al. | |
| 2011/0085028 | A1 * | 4/2011 | Samadani | G06K 9/00234 348/51 |
| 2011/0242285 | A1 * | 10/2011 | Byren | G01B 11/24 348/47 |
| 2011/0249190 | A1 * | 10/2011 | Nguyen | H04N 5/272 348/708 |
| 2011/0255762 | A1 * | 10/2011 | Deischinger | A61B 8/463 382/131 |
| 2011/0279650 | A1 * | 11/2011 | Liao | A01K 29/00 348/46 |
| 2011/0285825 | A1 * | 11/2011 | Tian | H04N 9/646 348/47 |
| 2012/0019612 | A1 * | 1/2012 | Choudury | H04N 13/0011 348/36 |
| 2012/0019614 | A1 * | 1/2012 | Murray | H04N 13/0007 348/36 |
| 2012/0050458 | A1 * | 3/2012 | Mauchly | H04N 5/23238 348/14.16 |
| 2012/0092445 | A1 * | 4/2012 | McDowell | G06K 9/00201 348/14.16 |
| 2013/0128118 | A1 * | 5/2013 | Chiang | H04N 7/0255 348/552 |

FOREIGN PATENT DOCUMENTS

| | | |
|---|---|---|
| CN | 101141608 A | 3/2008 |
| CN | 101154289 A | 4/2008 |
| CN | 101477626 B | 8/2010 |

OTHER PUBLICATIONS

Yong Rui (Digital Object Identifier (001) 10.1 007/s00530-004-0132-9).*
Yong Rui, Automating lecture capture and broadcast: technology and videography, Multimedia Systems © Springer-Verlag 2004, Digital Object Identifier (DOI) 10.1007/s00530-004-0132-9.*
Yong Rui et al., "Digital Object Identifier (001) 10.1 007/s00530-004-0132-9", 2003 Multimedia Systems http://download.springer.com/static/pdf/684/art%253A10.1007%252Fs00530-003-0084-5.pdf?originUrl=http%3A%2F%2Flink.springer.com%2Farticle%2F10.1007%2Fs00530-003-0084-5&token2=exp=1473097779~acl=%2Fstatic%2Fpdf%2F684%2Fart%25253A10.1007%25252Fs00530.*
Yong Rui et al., "Digital Object Identifier (001) 10.1 007/s00530-004-0132-9", 2003 Multimedia Systems http://download.springer.com/static/pdf/684/art%253A10.1007%252Fs00530-003-0084-5.pdf?originUrl=http%3A%2F%2Flink.springer.com%2Farticle%2F10.1007%2Fs00530-003-0084-5&token2=exp=1473097779~acl=%2Fstatic%2Fpdf%2F684%2Fartc%25253A10.1007%25252Fs005.*
Rui, et al., "Automating lecture capture and broadcast: technology and videography," Dec. 2004, [online], [retrieved on Jul. 6, 2010], Retrieved from Citeseer Multimedia Systems, Microsoft Research, Internet [<URL:http://citeseerx.ist.psu.edu/viewdoc/download?doi=10.1.1.91.1290&rep=rep1&type=pdf]>, 13 pages.

(56) References Cited

OTHER PUBLICATIONS

Kumano, et al, "Video Editing Support System Based on Video Grammar and Content Analysis," 16th International Conference on Pattern Recognition, 2002 IEEE, Aug. 2002, 6 pages.
Rui, et al, "Videography for Telepresentations," Technical Report MSR-TR-2001-92 [online], Oct. 2, 2001, [retrieved on Jul. 6, 2010], Retrieved from the Internet, Microsoft Research,<URL:ftp://ftp.research.microsoft.com/pub/tr/tr-2001-92.pdf>, 9 pages.
Toyama, et al., "Probabilistic Tracking in a Metric Space," Eighth International Conference on Computer Vision, Vancouver, Canada, vol. 2, Jul. 2001, 8 pages.
Office Action dated Nov. 1, 2013, Chinese Patent Application No. 201110321959.1, with English Summary of the Office action, 21 pages.
English Abstract for CN101141608A published Mar. 12, 2008, 3 pages.
English Abstract for CN101154289A published Apr. 2, 2008, 3 pages.
English Abstract for CN1794264A published Jun. 28, 2006, 1 page.
Response to Office Action filed Mar. 14, 2014 in Chinese Patent Application No. 201110321959.1 with English Summary and Amended Claims, 17 pages.
Office Action dated Jul. 16, 2014 in Chinese Patent Application No. 201110321959.1 with English Summary of the Office action, 14 pages.
Response to Office Action filed Sep. 28, 2014 in Chinese Patent Application No. 201110321959.1 with English Summary and Amended Claims, 4 pages.
Office Action dated Jan. 12, 2015, Chinese Patent Application No. 201110321959.1, with English Summary of the Office action, 13 pages.
Response to Final Office Action filed Apr. 21, 2015 in Chinese Patent Application No. 201110321959.1, with English Summary of the response, 8 pages.
Response to Office Action with English translation of claim amendments dated Sep. 22, 2015 in Chinese Patent Application No. 201110321959.1, 15 pages.
Office Action with English summary dated Nov. 6, 2015 in Chinese Patent Application No. 201110321959.1, 7 pages.
Response to Office Action with English summary and English translation of amended claims dated Jan. 19, 2016 in Chinese Patent Application No. 201110321959.1, 16 pages.
Notice of Allowance with English translation and English Translation of allowed claims dated Mar. 7, 2016 in Chinese Patent Application No. 201110321959.1, 9 pages.
Office Action dated Jul. 8, 2015 with English Summary in Chinese Patent Application No. 201110321959.1, 19 pages.
English Abstract for CN1774065A published May 17, 2006, 34 pages.
English Abstract for CN101477626B published Aug. 25, 2010, 7 pages.

\* cited by examiner

AUTOMATICALLY TRACKING USER MOVEMENT IN A VIDEO CHAT APPLICATION

BACKGROUND

Video communication systems such as video conferencing systems and video chat systems provide multiple participants located at different locations the ability to communicate with each other. Video communication systems may utilize web cameras and microphones to capture and transmit audio/video content to other users, in real time, over a network. However, video communication typically requires a user to be stationery by being in front of the camera while communicating with a remote user at a remote computing device. Any motion by the user typically results in the user no longer being optimally viewed by the camera and by the remote user at the remote computing device.

SUMMARY

Disclosed herein is a method and system by which a user participating in a video chat application with a remote user at a remote computing device can move within a field of view of a camera connected to the user's computing device and still be optimally viewed by the camera and by the remote user. In one embodiment, a position of the head, neck and shoulders of the user is automatically tracked by the camera as the user moves to different locations within the field of view, thereby eliminating the necessity of the user to be stationery and in front of the camera while interacting with the video chat application. A sub-frame of pixels containing the position of the head, neck and shoulders of the user in a first location within the field of view is identified and displayed to the remote user at the remote computing device. The user's movement to a next location within the field of view is detected by automatically tracking the position of the head, neck and shoulders of the user in the field of view. A next sub-frame of pixels identifying a position of the head, neck and shoulders of the user in the next location is identified and displayed to the remote user at the remote computing device.

In one embodiment, a method for automatically tracking movement of a user participating in a video chat application executing in a computing device is disclosed. The method includes receiving a capture frame comprising one or more depth images of a capture area from a depth camera connected to a computing device and determining if the capture frame includes a user in a first location in the capture area. The method includes identifying a sub-frame of pixels in the capture frame and displaying the sub-frame of pixels to a remote user at a remote computing device. The sub-frame of pixels contains a position of the head, neck and shoulders of the user in the first capture frame. The method then includes automatically tracking the position of the head, neck and shoulders of the user in the first sub-frame of pixels to a next location within the capture area. The method further includes identifying a next sub-frame of pixels and displaying the next sub-frame of pixels to the remote user in the remote computing system. The next sub-frame of pixels contains a position of the head, neck and shoulders of the user in the next location of the capture area.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 9A to 10C illustrate screen shots of a user's movement to different locations within a field of view of a capture device and a resulting output of a video feed that is displayed to a remote user at a remote computing system.

FIG. 9A is an exemplary illustration of a sub-frame of pixels identified in a capture frame.

FIG. 10C is an exemplary illustration of users displayed in individual sub-frames composited into a single output sub-frame to a remote user via a display screen at a remote computing device.

DETAILED DESCRIPTION

A method for automatically tracking movement of a user participating in a video chat application and displaying a continuous framed picture of the user is disclosed. A capture device connected to the computing device captures a user in a field of view of the capture device. A sub-frame of pixels containing the head, neck and shoulders of the user in a capture frame of a capture area captured by the capture device, is identified. The sub-frame of pixels is displayed to a remote user at a remote computing system who is participating in the video chat application with the user. In one embodiment, the capture device also detects more than one user in the capture area and automatically adjusts the sub-frame of pixels to include all the users. The sub-frame of pixels identifying the head, neck and shoulders of the users is displayed to a remote user at a remote computing system. In this manner, a better user experience between users of the video chat application is provided, as each user's head, neck and shoulders are consistently displayed to the remote user, irrespective of the user's movement with the capture frame.

In one embodiment, the movement of the user to a next location in the capture area is detected by automatically tracking the position of the head, neck and shoulders of the user in the capture area. A next sub-frame of pixels containing the user in the next location in the capture area is displayed to the remote user. In one embodiment, to optimally display the user to the remote user, the position of the head, neck and shoulders of the user is automatically centered in the sub-frame of pixels, prior to displaying the sub-frame of pixels to the remote user.

Figure 1:
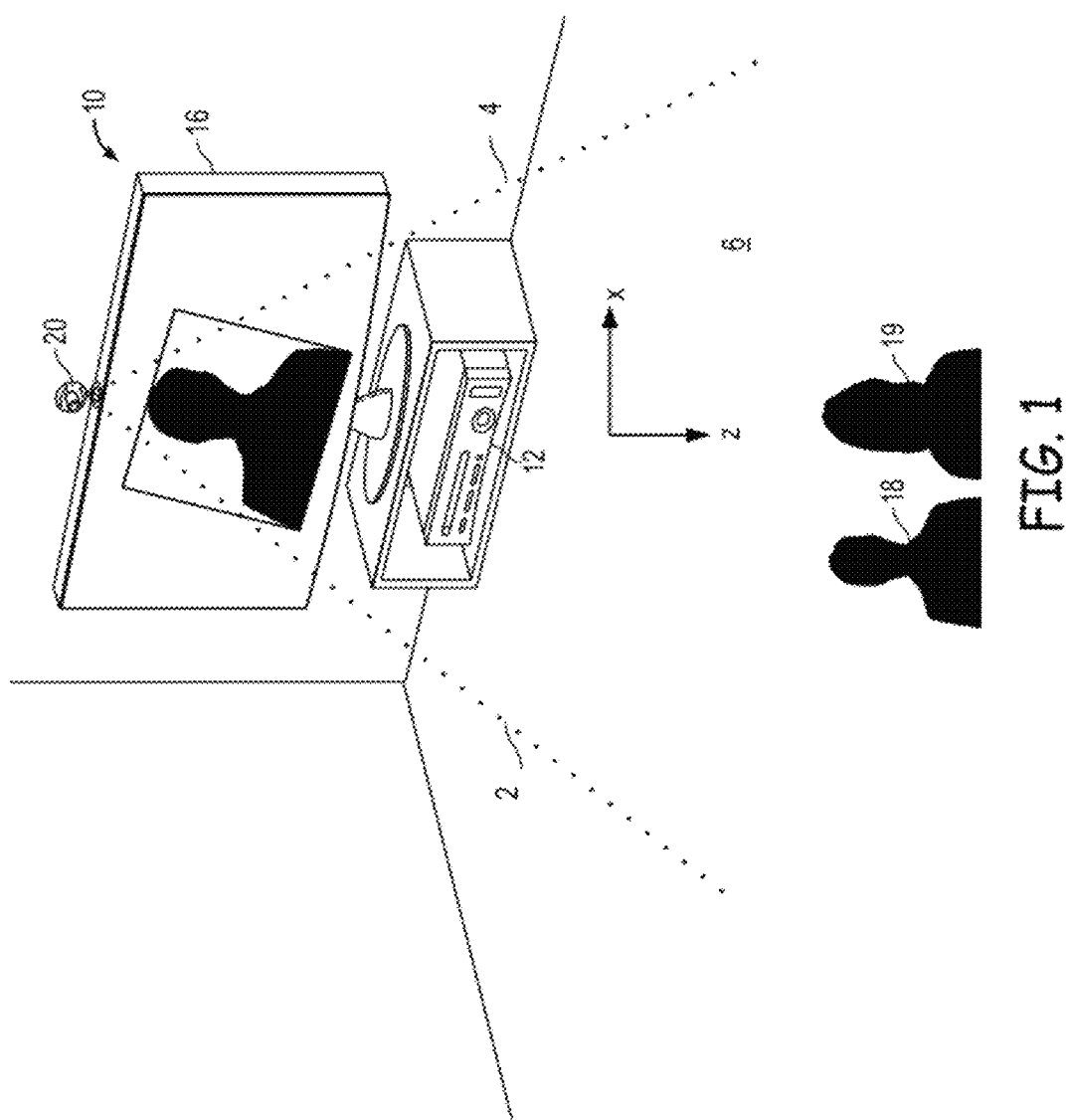
FIG. 1 illustrates one embodiment of a target recognition, analysis and tracking system for performing the operations of the disclosed technology.

FIG. 1 illustrates one embodiment of a target recognition, analysis and tracking system 10 (generally referred to as a tracking system hereinafter) for performing the operations of the disclosed technology. The target recognition, analysis and tracking system 10 may be used to recognize, analyze, and/or track one or more human targets such as users 18 and 19. As shown in FIG. 1, the tracking system 10 may include a computing device 12. In one embodiment, computing device 12 may be implemented as any one or a combination of a wired and/or wireless device, personal computer, portable computer device, mobile computing device, media device, communication device, video processing and/or rendering device, gaming device, electronic device, and/or as any other type of device that can be implemented to receive media content in any form of audio, video, and/or image data. According to one embodiment, the computing device 12 may include hardware components and/or software components such that the computing device 12 may be used to execute gaming or other non-gaming applications. In one embodiment, computing device 12 may include a processor such as a standardized processor, a specialized processor, a microprocessor, or the like that may execute instructions stored on a processor readable storage device for performing the processes described herein.

As shown in FIG. 1, the tracking system 10 may further include a capture device 20. The capture device 20 may be, for example, a camera that may be used to visually monitor one or more users, such as users 18 and 19, such that movements, gestures and audio responses from the users may be captured and tracked by the capture device 20.

According to one embodiment, computing device 12 may be connected to an audiovisual device 16 such as a television, a monitor, a high-definition television (HDTV) or the like that may provide visuals and/or audio to users 18 and 19. For example, the computing device 12 may include a video adapter such as a graphics card and/or an audio adapter such as a sound card that may provide the audiovisual signals to an output device. The audiovisual device 16 may receive the audiovisual signals from the computing device 12 and may output visuals and/or audio associated with the audiovisual signals to users 18 and 19. According to one embodiment, the audiovisual device 16 may be connected to the computing device 12 via, for example, an S-Video cable, a coaxial cable, an HDMI cable, a DVI cable, a VGA cable, or the like.

In one embodiment, capture device 20 detects one or more users, such as users 18, 19 within a field of view, 6, of the capture device and tracks the movement of the users within the field of view 6, while the users interact with a video chat application 190 executing in the computing device 12. Lines 2 and 4 denote a boundary of the field of view 6. The operations performed by the computing device 12 and the capture device 20 are discussed in detail below.

Figure 2:
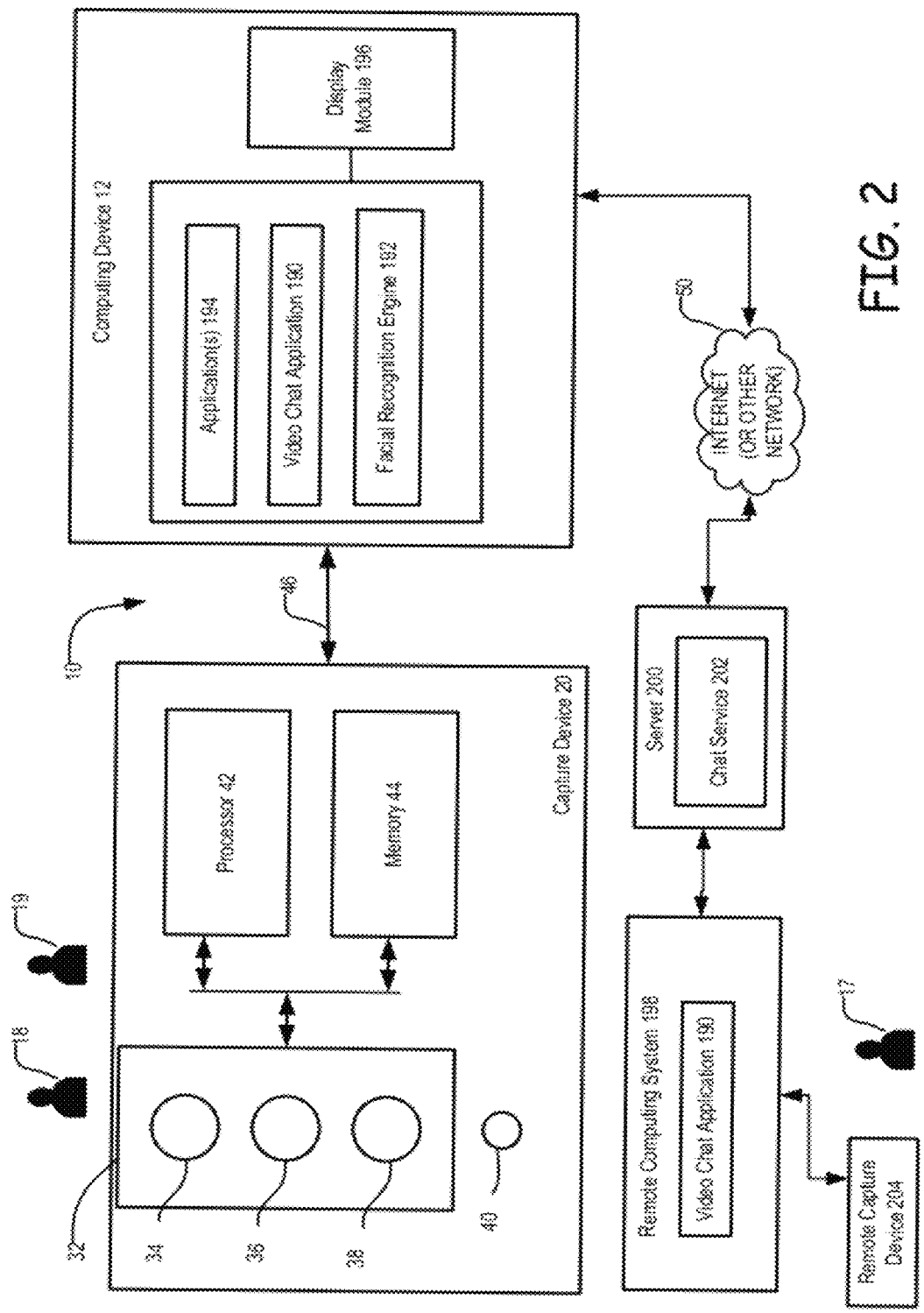
FIG. 2 illustrates one embodiment of a capture device that may be used as part of the tracking system.

FIG. 2 illustrates one embodiment of a capture device 20 and a computing device 12 that may be used in the target recognition, analysis and tracking system 10 to recognize human and non-human targets in a capture area and uniquely identify them and track them in three dimensional space. Capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z-axis extending from the depth camera along its line of sight.

As shown in FIG. 2, capture device 20 may include an image camera component 32. According to one embodiment, the image camera component 32 may be a depth camera that may capture a depth image of a scene. The depth image may include a three-dimensional (3-D) pixel area of the captured scene where each pixel in the 3-D pixel area may represent a depth value such as a distance in, for example, centimeters, millimeters, or the like of an object in the captured scene from the camera.

As shown in FIG. 2, the image camera component 32 may include an IR light component 34, a three-dimensional (3-D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more targets and objects in the capture area using, for example, the 3-D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the targets or objects in the capture area. Additionally, the phase of the outgoing light wave may be compared to the phase of the incoming light wave to determine a phase shift. The phase shift may then be used to determine a physical distance from the capture device to a particular location on the targets or objects.

According to one embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more targets or objects in the capture area, the pattern may become deformed in response. Such a deformation of the pattern may be captured by, for example, the 3-D camera 36 and/or the RGB camera 38 and may then be analyzed to determine a physical distance from the capture device to a particular location on the targets or objects. In one embodiment, the IR light component 34 may also include a visible light sensor to sense visible light.

According to one embodiment, the capture device 20 may include two or more physically separated cameras that may view a capture area from different angles, to obtain visual stereo data that may be resolved to generate depth information. Other types of depth image sensors can also be used to create a depth image.

The capture device 20 may further include a microphone 40. The microphone 40 may include a transducer or sensor that may receive and convert sound into an electrical signal. According to one embodiment, the microphone 40 may be used to reduce feedback between the capture device 20 and the computing device 12 in the target recognition, analysis and tracking system 10. Additionally, the microphone 40 may be used to receive audio signals that may also be provided by the user to control an application 190 such as a game application or a non-game application, or the like that may be executed by the computing device 12.

In one embodiment, capture device 20 may further include a processor 42 that may be in operative communication with the image camera component 32. The processor 42 may include a standardized processor, a specialized processor, a microprocessor, or the like that may execute instructions that may include instructions for storing profiles, receiving the depth image, determining whether a suitable target may be included in the depth image, converting the suitable target into a skeletal representation or model of the target, or any other suitable instruction.

The capture device 20 may further include a memory component 44 that may store the instructions that may be executed by the processor 42, images or frames of images captured by the 3-D camera or RGB camera, user profiles or any other suitable information, images, or the like. According to one example, the memory component 44 may include random access memory (RAM), read only memory (ROM), cache, Flash memory, a hard disk, or any other suitable storage component. As shown in FIG. 2, the memory component 44 may be a separate component in communication with the image capture component 32 and the processor 42. In another embodiment, the memory component 44 may be integrated into the processor 42 and/or the image capture component 32. In one embodiment, some or all of the components 32, 34, 36, 38, 40, 42 and 44 of the capture device 20 illustrated in FIG. 2 are housed in a single housing.

The capture device 20 may be in communication with the computing device 12 via a communication link 46. The communication link 46 may be a wired connection including, for example, a USB connection, a Firewire connection, an Ethernet cable connection, or the like and/or a wireless connection such as a wireless 802.11b, g, a, or n connection. The computing device 12 may provide a clock to the capture device 20 that may be used to determine when to capture, for example, a scene via the communication link 46.

The capture device 20 may provide the depth information and images captured by, for example, the 3-D (or depth) camera 36 and/or the RGB camera 38, to the computing device 12 via the communication link 46. The computing device 12 may then use the depth information and captured images to control one or more game or non-game applications 194 and a video chat application 190 that may be executed by computing device 12.

In one embodiment, capture device 20 initially captures one or more users 18, 19 in a field of view, 6, of the capture device. Capture device 20 provides a visual image of the captured users to the computing device 12. Computing device 12 performs the identification of the users captured by the capture device 20. In one embodiment, computing device 12 includes a facial recognition engine 192 to perform the unique identification of users within the field of view, 6 of the capture device 20. In one example, facial recognition engine 192 may correlate a user's face from a visual image received from the capture device 20 with a reference visual image to determine the user's identity. In another example, the user's identity may be also determined by receiving input from the user identifying their identity. In one embodiment, users may be asked to identify themselves by standing in front of the computing system 12 so that the capture device 20 may capture depth images and visual images for each user. For example, a user may be asked to stand in front of the capture device 20, turn around, and make various poses. After the computing system 12 obtains data necessary to identify a user, the user is provided with a unique identifier and password identifying the user. More information about identifying users can be found in U.S. patent application Ser. No. 12/696,282, "Visual Based Identity Tracking" and U.S. patent application Ser. No. 12/475, 308, "Device for Identifying and Tracking Multiple Humans over Time," both of which are incorporated herein by reference in their entirety. In another embodiment, the user's identity may already be known by the computing device when the user logs into the computing device, such as, for example, when the computing device is a mobile computing device such as the user's cellular phone.

In one embodiment of the present technology, computing device 12 includes a video chat application 190 that enables users 18, 19 to visually and aurally communicate with a remote user 17 at a remote computing system 198. Remote user 17 communicates with users 18, 19 via a remote capture device 204 and a video chat application 190 residing in the remote computing system 198. Chat service 202 in server 200 establishes communication between users 17, 18 and 19 and maintains a connection between the users while they communicate with each other via the video chat application 190. In one example, video chat application 190 also enables groups of users, each having their own computing device and capture device, to participate in a group chat or group discussions with each other via chat service 202.

In one embodiment, upon detection and identification of one or more users 18, 19 in the field of view, 6, as discussed above, capture device 20 automatically tracks a position of the head, neck and shoulders of the users as the users move to different locations within the field of view, 6, while interacting with the video chat application. The operations performed by the capture device 12 and computing device 20 are discussed in detail in FIGS. 5-7 below.

Figure 3:
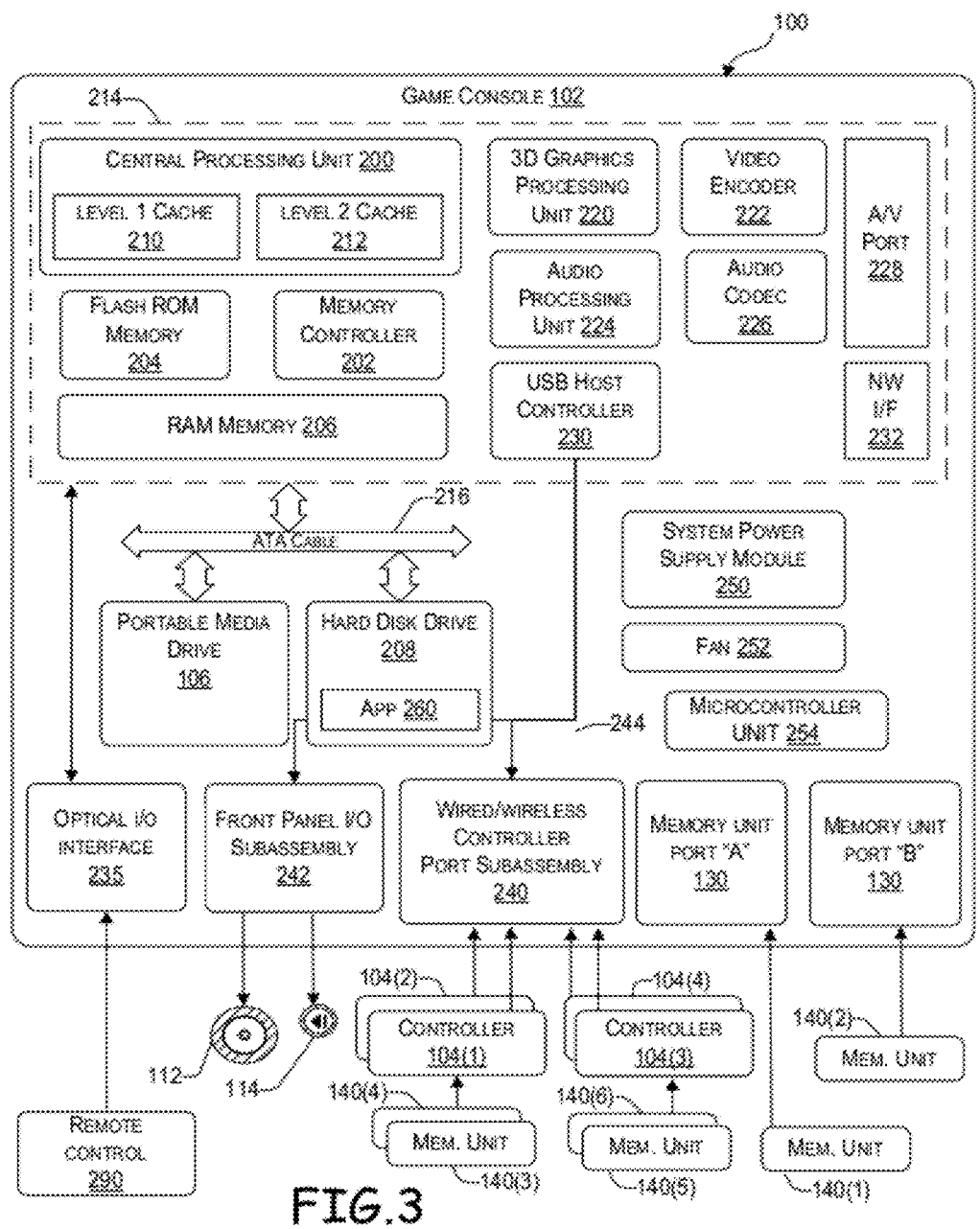
FIG. 3 illustrates an example of a computing device that may be used to implement the computing device of FIGS. 1-2.

FIG. 3 illustrates an example of a computing device 100 that may be used to implement the computing device 12 of FIGS. 1-2. In one embodiment, the computing device 100 of FIG. 3 may be a multimedia console 100, such as a gaming console. As shown in FIG. 3, the multimedia console 100 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller 202 via the PCI bus and an AT Attachment (ATA) bus 216. However, in other implementations, dedicated data bus structures of different types can also be applied in the alternative.

A graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multichannel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 3 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 3, console 102 includes a controller support subassembly 240 for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202. A system power supply module 250 provides power to the components of gaming system 100. A fan 252 cools the circuitry within console 102.

An application 260 comprising machine instructions is stored on hard disk drive 208. When console 102 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 100 may be operated as a standalone system by simply connecting the system to an audiovisual device 16 (FIG. 1), a television, a video projector, or other display device. In this standalone mode, gaming and media system 100 enables one or more players to play games, or enjoy digital media, e.g., by watching movies, or listening to music. However, with the integration of broadband connectivity made available through network interface 232, gaming and media system 100 may further be operated as a participant in a larger network gaming community.

Figure 4:
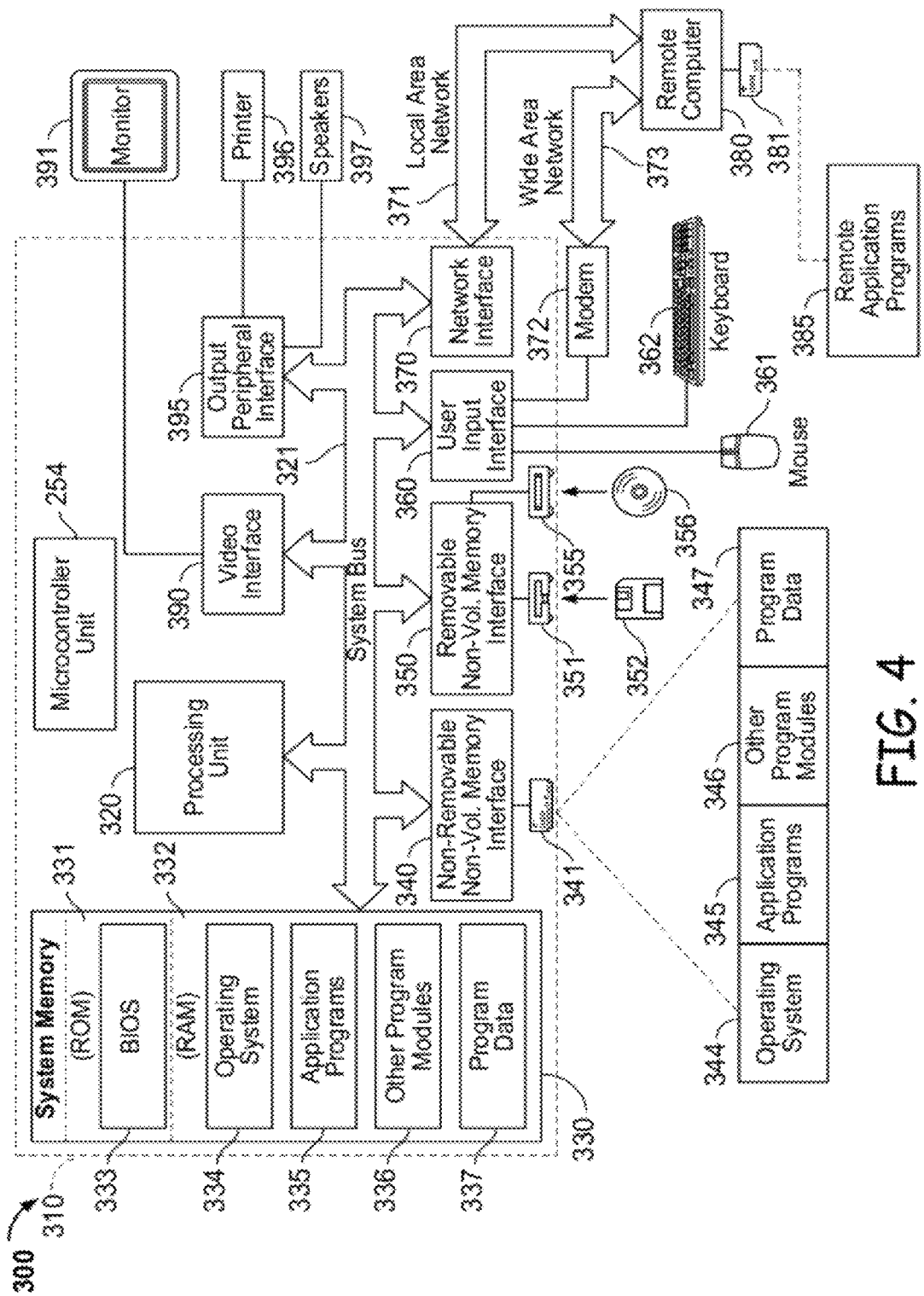
FIG. 4 illustrates a general purpose computing device which can be used to implement another embodiment of computing device.

FIG. 4 illustrates a general purpose computing device which can be used to implement another embodiment of computing device 12. With reference to FIG. 4, an exemplary system for implementing embodiments of the disclosed technology includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Figure 5:
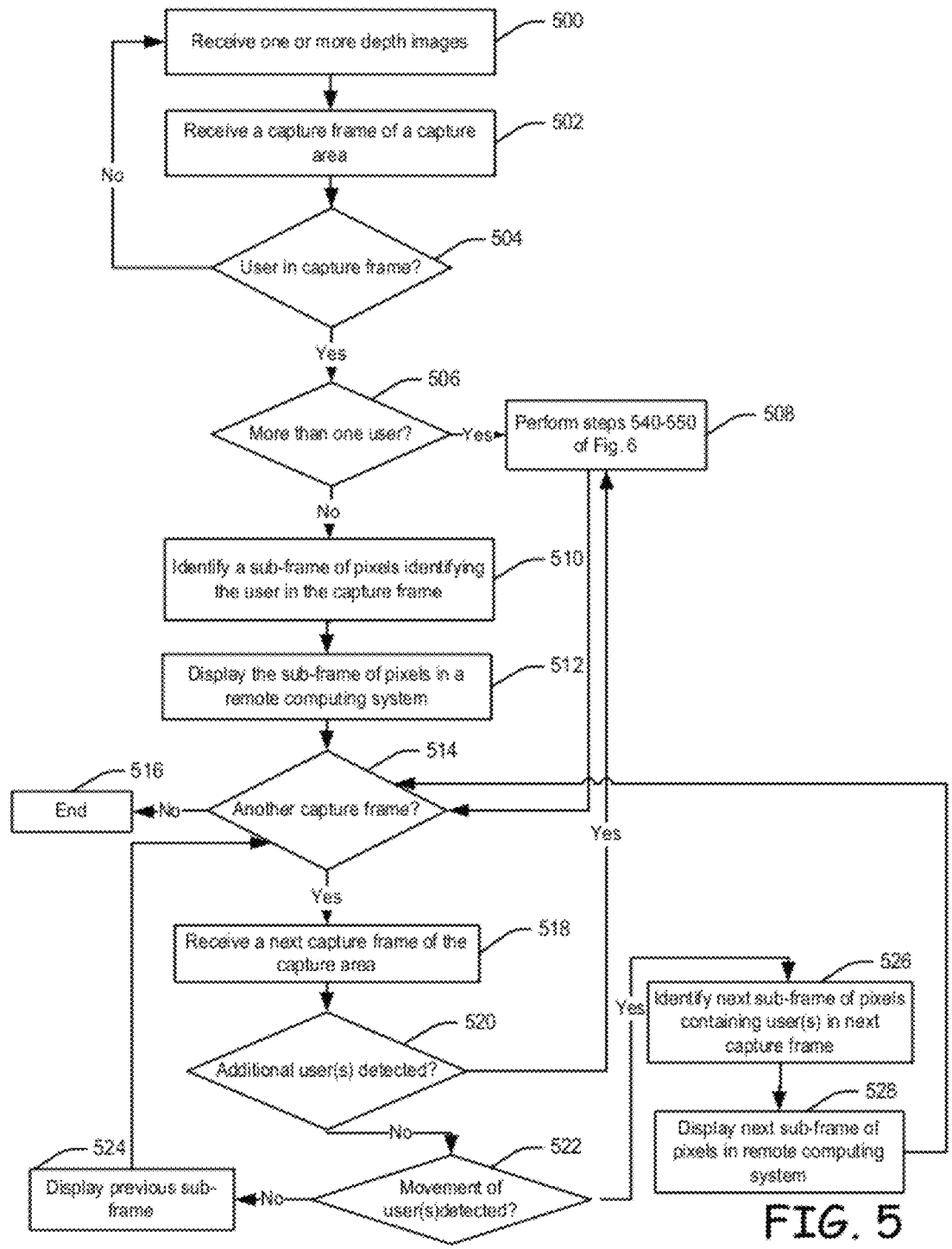
FIG. 5 is a flowchart describing one embodiment of a process for automatically tracking a position of the head, neck and shoulders of a user as the user moves within a field of view of a capture device while interacting with a video chat application executing in a computing device.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 5 illustrates operating system 334, application programs 335, other program modules 336, and program data 337.

The computer 310 may also include other removable/non-removable, volatile/nonvolatile computer storage media. By way of example only, FIG. 5 illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 4, provide storage of computer readable instructions, data structures, program modules and other data for the computer 310. In FIG. 4, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 20 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 390.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 4. The logical connections depicted in FIG. 4 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 4 illustrates remote application programs 385 as residing on memory device 381. It will be appreciated that the network connections shown are exemplary and other means of establishing a communications link between the computers may be used.

FIG. 5 is a flowchart describing one embodiment of a process for automatically tracking a position of the head, neck and shoulders of a user as the user moves within a field of view of a capture device while interacting with a video chat application executing in a computing device. The example method may be implemented using, for example, the image camera component 32 and/or the computing device 12, 100 or 300 as discussed in connection with FIGS. 2-4.

At step 500, processor 42 of the capture device 20 receives one or more depth images from the image camera component 32. In one example, both a depth image and a red green blue (RGB) image may be received at step 500. The depth image and the RGB image may be captured by any of the sensors in the image camera component 32 or other suitable sensors as are known in the art. In one embodiment the depth image is captured separately from the RGB image. In some implementations the depth image and RGB image are captured at the same time while in others they are captured sequentially or at different times. In other embodiments the depth image is captured with the RGB image or combined with the RGB image as one image file so that each pixel has an R value, a G value, a B value and a Z value (representing distance). At step 500, depth information corresponding to the RGB image and depth image is also determined. Depth information may include a plurality of observed pixels for one or more targets within the image, where each observed pixel has an observed depth value. In one example, image camera component 32 may obtain the depth information associated with the one or more targets in the capture area using any suitable technique such as time-of-flight analysis, structured light analysis, stereo vision analysis, or the like, as discussed.

Figure 9A:
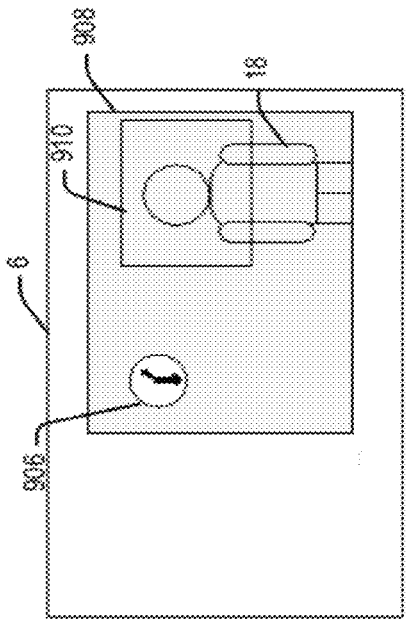

At step 502, a capture frame of a capture area is received. The capture area may include, for example, the field of view, 6 of the capture device 20. The capture frame may include a depth image and an RGB image captured by the image camera component 32. In one example, the capture frame has a resolution of 1024×1024 pixels. FIG. 9A is an exemplary illustration of a capture frame in a capture area, 6 captured by the capture device 20.

At step 504, a determination is made as to whether the capture frame includes a human target such as a user 18 or 19 in a first location in the capture area. In one example, each target in the capture frame may be flood filled and compared to a pattern to determine whether the capture frame includes a human target. In one example, the edges in each target in the capture frame may be determined. The capture frame may include a three dimensional pixel area of the captured scene. Each pixel in the 3D pixel area may represent a depth value such as a length or distance for example as can be measured from the image camera component 32. The edges may be determined by comparing various depth values associated with adjacent or nearby pixels of the capture frame. If the various depth values being compared are greater than a pre-determined edge tolerance, the pixels may define an edge. The capture device may organize the calculated depth information including the depth image into Z layers or layers that may be perpendicular to a Z-axis extending from the camera along its line of sight to the viewer. The likely Z values of the Z layers may be flood filled based on the determined edges. For instance, the pixels associated with the determined edges and the pixels of the area within the determined edges may be associated with each other to define a target or an object in the capture area.

Figure 6:
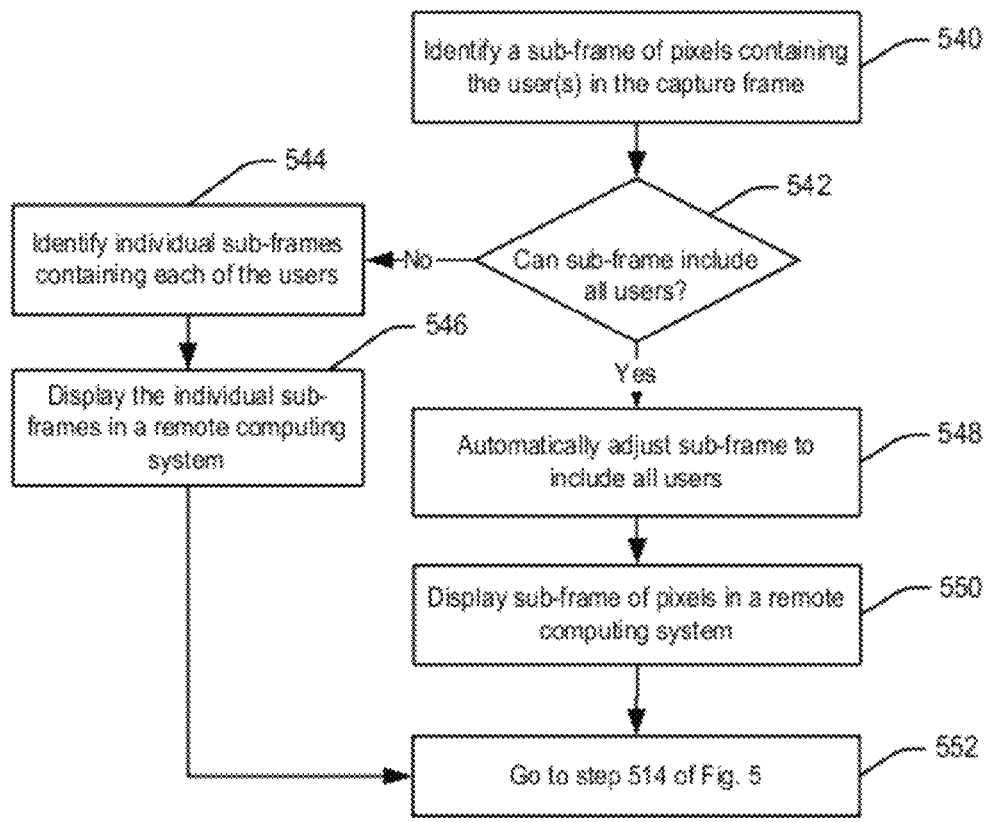
FIG. 6 is a flowchart describing one embodiment of performing the process described in FIG. 5 when more than one user is detected in the capture area.

At step 506, it is determined if more than one user is included in the capture frame. If it is determined that more than one user is included in the capture frame, then steps (540-550) of the process described in FIG. 6 are performed, at step 508. Upon completion of steps (540-550) of FIG. 6, the process continues at step 514 in FIG. 5 to receive the next capture frame. At steps 504 and 506, an identification of the user in the capture frame may also be performed. In one embodiment, computing device 12 may perform the identification of the user captured by the capture device. As discussed above, facial recognition engine 192 in the computing device 12 may perform the identification of the user.

Figure 8:
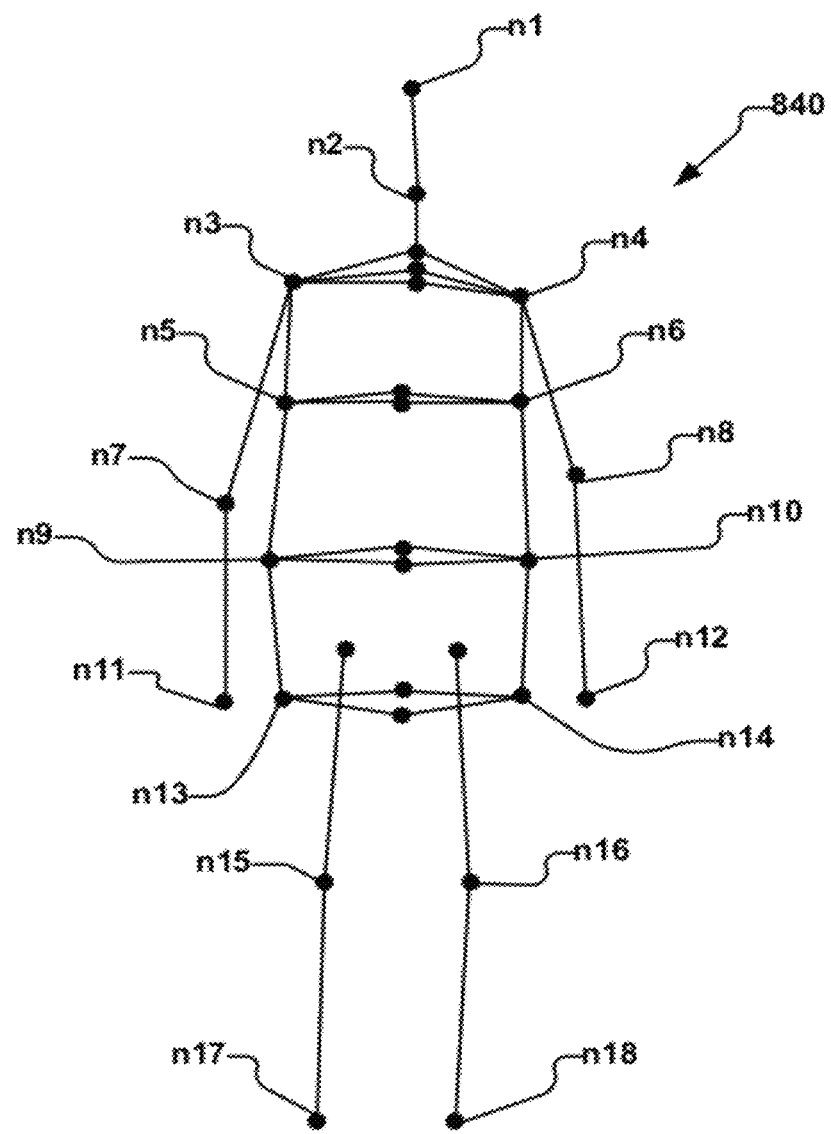
FIG. 8 illustrates an example of a skeletal model or mapping representing a scanned human target that may be generated in FIG. 5.

At step 506, if it is determined that the capture frame includes only one user, then at step 510, a sub-frame of pixels of the RGB image containing a position of the head, neck and shoulders of the user in the capture frame, is identified. FIG. 9A is an exemplary illustration of a sub-frame of pixels identified in a capture frame. In one embodiment, identifying a sub-frame of pixels includes generating a skeletal model of the user based on the depth image and visual image captured by the image camera component 32 in step 500. In one example, the skeletal model of the user may be generated by scanning information such as bits or pixels associated with the user to determine one or more body parts associated with the user. In one example, the user may be isolated and a bit mask may be created to scan for one or more body parts associated with the user. The bit mask may be created for example by flood filling the user such that the user is separated from other users or objects in the capture area. The bit mask may then be analyzed for one or more body parts to generate a skeletal model, a mesh human model or the like of the user. For example, measurement values determined by the scanned bit mask may be used to define one or more joints in the skeletal model. The bitmask may include values of a human target along an X, Y and Z-axis. The joints may be used to define one or more bones that may correspond to a body part of the human. FIG. 8 illustrates an example of a skeletal model or mapping 840 representing a scanned human target that may be generated at step 506.

According to one embodiment, to identify a sub-frame of pixels that corresponds to the head, neck and shoulders of the user, a width of the bitmask, for example, at a position being scanned, may be compared to a threshold value of a typical width associated with a head, neck and shoulders. In an alternative embodiment, the distance from a previous position scanned and associated with a body part in a bitmask may be used to determine the location of the head neck and shoulders. For example, to determine the location of the shoulders, the width of the bitmask at the shoulder position may be compared to a threshold shoulder value. For example, a distance between the two outer most Y values at the X value of the bitmask at the shoulder position may be compared to the threshold shoulder value of a typical distance between, for example, shoulders of a human. Thus, according to an example embodiment, the threshold shoulder value may be a typical width or range of widths associated with shoulders of a body model of a human. In one embodiment, some body parts such as legs, feet, or the like may also be calculated based on, for example, the location of other body parts. For example, as described above, the information such as the bits, pixels, or the like associated with the human target may be scanned to determine the locations of various body parts of the human target. Based on such locations, subsequent body parts such as legs, feet, or the like may then be calculated for the human target.

Figure 9B:
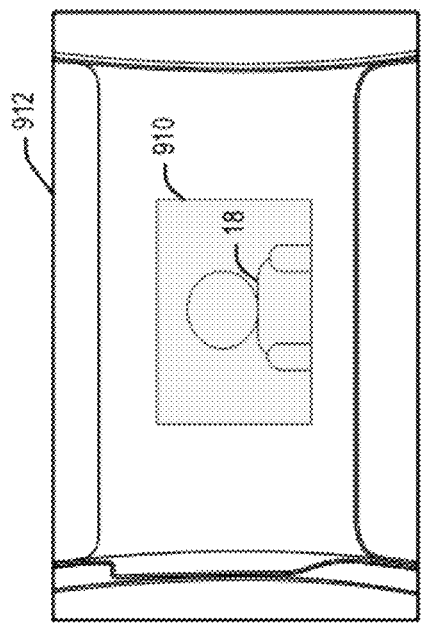
FIG. 9B is an exemplary illustration of an output of a video feed that is displayed to the remote user.

At step 512, the sub-frame of pixels containing the user's head, neck and shoulders is displayed to the remote user 17 at the remote computing system 198. In one example, the sub-frame of pixels has a resolution of 640×480 pixels. In one embodiment, the position of the head, neck and shoulders of the user is automatically centered in the sub-frame of pixels, prior to displaying the sub-frame of pixels to the remote user 17. Computing device 12 encodes the sub-frame of pixels into a video data communication data stream. The encoded sub-frame of pixels is displayed to the remote user 17 at the remote computing system 198 who is also participating in the video chat application 190 with the user such as user 18 or 19. Note that the resolution of the sub-frame of pixels may be scaled to match the pixel resolution of the remote computing system prior to displaying the sub-frame of pixels to the remote user in situations where the pixel resolution of the remote computing system 198 does not match the pixel resolution of the user's computing system. FIG. 9B is an exemplary illustration of an output of a video feed that is displayed to the remote user 17.

At step 514, it is determined if another capture frame from the depth camera is received. If another capture frame is not received at step 514, then the process ends at step 516. At step 518, the next capture frame from the depth camera is received. At step 520, it is determined if one or more additional users are detected in the next capture frame. If one or more additional users are detected, then steps (540-550) of the process described in FIG. 6 are performed, at step 508.

Upon completion of steps (540-550) of FIG. 6, the process continues at step 514 to receive the next capture frame.

Figure 9C:
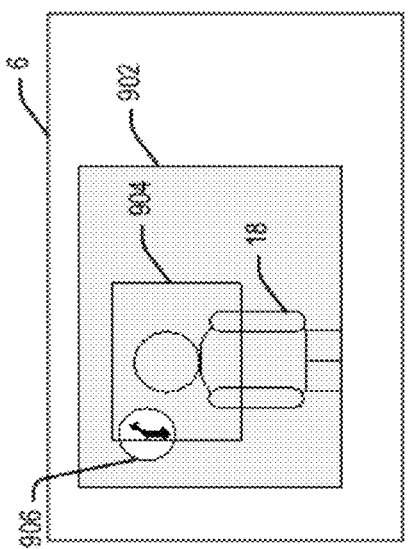
FIG. 9C is an exemplary illustration of a user's movement to a next location within the capture area.

If one or more additional users are not detected in the next capture frame, then at step 522, it is determined if movement of one or more users within the capture area is detected. If movement of the one or more users is not detected, then the previous sub-frame of pixels is displayed to the remote user at step 524 and the process continues to step 514 to determine if a next capture frame is received. If movement of the one or more users is detected, then the movement of the one or more users within the capture is tracked using the skeletal model of the users obtained in step 504. In one example, the movement of the one or more users is detected by determining if the next capture frame includes the one or more users in a next location in the capture area. FIG. 9C is an exemplary illustration of a user's movement to a next location within the capture area.

In one example, lateral movement of the one or more users within the capture area may be tracked. In another example, movement of the one or more users at different distances from the depth camera, for example, away or towards the depth camera may also be tracked. For example, the movement of the one or more users may be tracked by adjusting and updating the skeletal model as the one or more users move in physical space in front of the depth camera within the capture area, 6, by updating the location of the one or more users within the capture area, several times per second. Information from the depth camera may be used to adjust the model so that the skeletal model accurately represents the one or more users. In one example, this is accomplished by one or more forces applied to one or more force receiving aspects of the skeletal model to adjust the skeletal model into a pose that more closely corresponds to the pose of the human target and physical space. More information about motion detection and tracking can be found in U.S. patent application Ser. No. 12/641,788, titled "Motion Detection Using Depth Images," filed on Dec. 18, 2009 incorporated herein by reference in its entirety.

At step 526, a next sub-frame of pixels containing the head, neck and shoulders of the one or more users in the next capture frame is identified. The next sub-frame of pixels may be identified in a manner similar to the first sub-frame of pixels discussed in step 510.

Figure 9D:
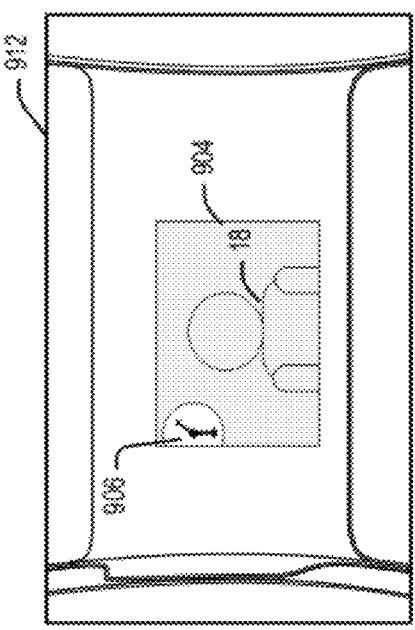
FIG. 9D is an exemplary illustration of a next sub-frame of pixels that is displayed to the remote user.

At step 528, the next sub-frame of pixels is displayed to the remote user 17 in the remote computing system 198. FIG. 9D is an exemplary illustration of a next sub-frame of pixels that is displayed to the remote user. In one embodiment, the size of the sub-frame of pixels in the capture frame (obtained in step 510) is different from the size of the next sub-frame of pixels in the next capture frame (obtained in step 526). In one embodiment, to optimally display the one or more users to the remote user 17, the position of the head, neck and shoulders of the one or more users is automatically centered in the next sub-frame of pixels, prior to displaying the next sub-frame of pixels to the remote user. In another embodiment, to optimally display the one or more users to the remote user 17 when the user is at different distances from the capture device, the size of the head, neck and shoulders of the one or more users in the sub-frame of pixels and the next sub-frame of pixels is automatically altered, so that the position of the head, neck and shoulders of the one or more users in the sub-frame of pixels and the next sub-frame of pixels is approximately constant prior to the displaying. The process continues to step 514 to determine if another capture frame from the depth camera is received.

Figure 10A:
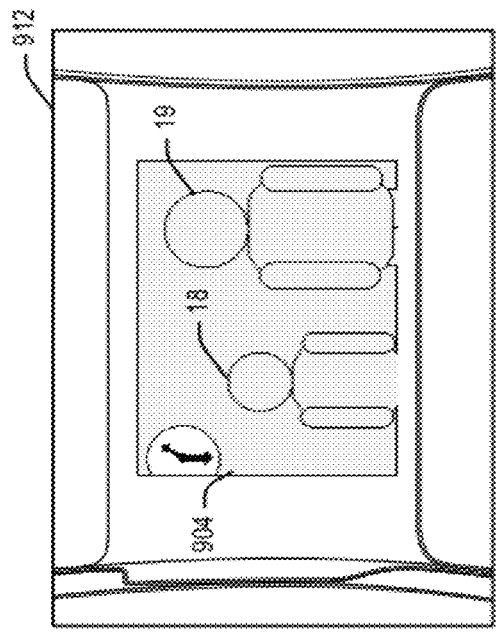
FIG. 10A illustrates the detection and identification of more than one user in a sub-frame of pixels in a capture frame of a capture area.

FIG. 6 is a flowchart describing one embodiment of performing the process described in FIG. 5 when more than one user is detected in the capture area. If it is determined that more than one user is detected in the capture frame at step 506 in FIG. 5, then a sub-frame of pixels containing the head, neck and shoulders of the users in the capture frame is identified at step 540. FIG. 10A illustrates the detection and identification of more than one user in a sub-frame of pixels in a capture frame of a capture area. At step 542, it is determined if the sub-frame of pixels can include all the users. If the sub-frame of pixels cannot include all the users, then individual sub-frames of pixels containing each of the users is identified at step 544. At step 546, the individual sub-frames of pixels are displayed to the remote user. In one example, the resolution of the individual sub-frames of pixels may be scaled to match the pixel resolution of the remote computing system prior to displaying the individual sub-frame of pixels to the remote user in situations where the pixel resolution of the remote computing system 198 does not match the pixel resolution of the user's computing system.

Figure 10B:
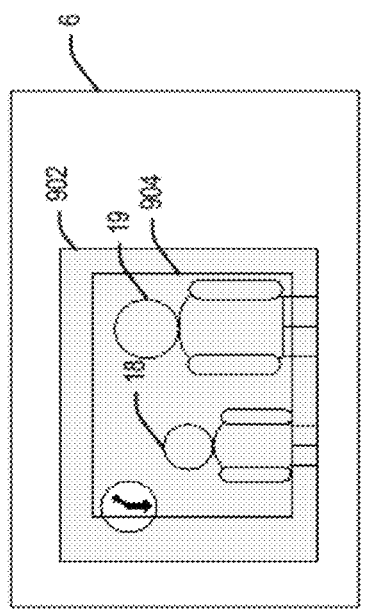
FIG. 10B is an exemplary illustration of an output of a video feed that is displayed to a remote user via a display screen at a remote computing device.
Figure 10C:
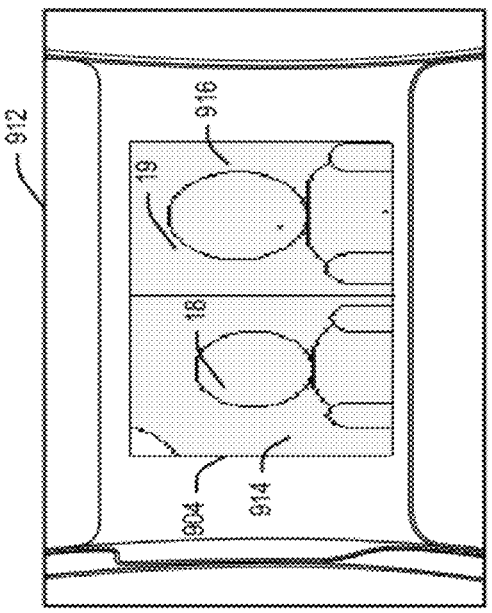

At step 542, if it is determined that the sub-frame of pixels can include all the users then the sub-frame of pixels is automatically adjusted to include all the users, in step 548. In one example, the sub-frame of pixels is automatically adjusted to automatically center the position of the head, neck and shoulders of the users in the sub-frame of pixels, prior to displaying the sub-frame of pixels to the remote user. In step 550, the sub-frame of pixels is displayed to the remote user. In another example, individual sub-frames may be created for multiple users, composited into a single output sub-frame of pixels and displayed to the remote user at the remote computing system as illustrated in FIG. 10C. In step 552, the process continues to step 514 of FIG. 5 to determine if another capture frame is received from the depth camera.

In one embodiment, computing device 12 may identify the users as a group of users in the sub-frame of pixels when the users are sufficiently close together, for a minimum period of time. In another embodiment, computing system 12 may identify individual sub-frames of pixels containing each of the users (as discussed in step 544) when the users are no longer sufficiently close together, for a minimum period of time. The individual sub-frames of pixels are displayed to the remote user 17 at the remote computing system 198. The minimum period of time can be pre-determined by the computing device 12, in one embodiment. A movement of the group of users to a next location within the capture area may then be automatically tracked by determining the position of the head, neck and shoulders of the group of users in the capture area, as discussed above. More information about identifying and tracking a group of users can be found in U.S. patent application Ser. No. 12/688,793, titled "Tracking Groups of Users in Motion Capture System", filed on Jan. 15, 2010, which is incorporated herein by reference in its entirety.

Figure 7:
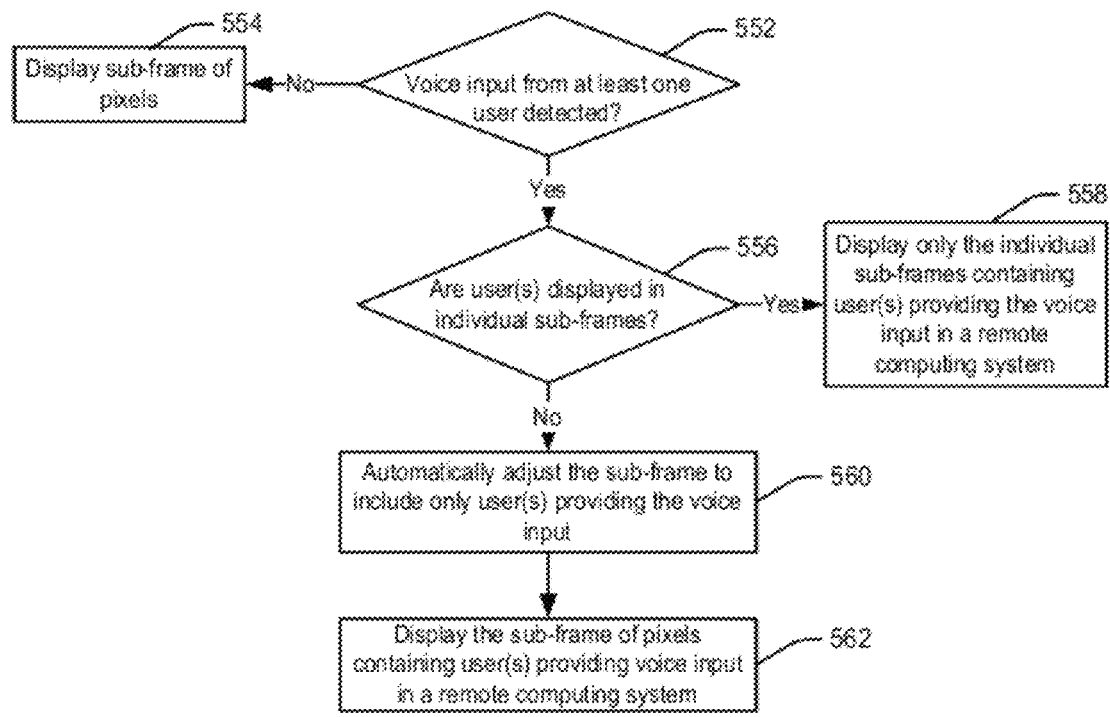
FIG. 7 is a flowchart describing another embodiment of a process for performing the operations of the disclosed technology in which a sub-frame of pixels containing one or more users providing voice input while interacting with the video chat application is identified.

FIG. 7 is a flowchart describing another embodiment of a process for performing the operations of the disclosed technology in which a sub-frame of pixels containing one or more users providing voice input while interacting with the video chat application is identified. In one embodiment, the steps of FIG. 7 may be performed upon identifying a sub-frame of pixels in a capture frame containing more than one user (as discussed in step 540 of FIG. 6). In step 552, it is determined if a voice input is detected from at least one user in the sub-frame of pixels. In one example, the microphone 40 in the capture device 20 may be utilized to detect an audio or voice input from the users. If a voice input is not detected from the users, then in step 554, the sub-frame of pixels is displayed to the remote user, as discussed in step 546 or step 550 of FIG. 6.

If a voice input is detected from at least one user, then it is determined if the user(s) are displayed in individual sub-frames to the remote user in step 556. If the user(s) are displayed in individual sub-frames, then the individual sub-frames containing only the user(s) providing the voice input are displayed to the remote user in step 558. If the user(s) are not displayed in individual sub-frames, then the sub-frame of pixels is automatically adjusted to include only the user(s) providing the voice input in step 560. In one example, the sub-frame of pixels is automatically adjusted to automatically center the position of the head, neck and shoulders of the user(s) providing the voice input in the sub-frame of pixels, prior to displaying the sub-frame of pixels to the remote user 17. In step 562, the sub-frame of pixels containing the user(s) providing the voice input is displayed to the remote user.

FIG. 8 illustrates an example of a skeletal model or mapping 840 representing a scanned human target that may be generated at step 504 of FIG. 5. According to one embodiment, the skeletal model 840 may include one or more data structures that may represent a human target as a three-dimensional model. Each body part may be characterized as a mathematical vector defining joints and bones of the skeletal model 840.

Skeletal model 840 includes joints n1-n18. Each of the joints n1-n18 may enable one or more body parts defined there between to move relative to one or more other body parts. A model representing a human target may include a plurality of rigid and/or deformable body parts that may be defined by one or more structural members such as "bones" with the joints n1-n18 located at the intersection of adjacent bones. The joints n1-n18 may enable various body parts associated with the bones and joints n1-n18 to move independently of each other or relative to each other. For example, the bone defined between the joints n7 and n11 corresponds to a forearm that may be moved independent of, for example, the bone defined between joints n15 and n17 that corresponds to a calf. It is to be understood that some bones may correspond to anatomical bones in a human target and/or some bones may not have corresponding anatomical bones in the human target.

The bones and joints may collectively make up a skeletal model, which may be a constituent element of the model. An axial roll angle may be used to define a rotational orientation of a limb relative to its parent limb and/or the torso. For example, if a skeletal model is illustrating an axial rotation of an arm, a roll joint may be used to indicate the direction the associated wrist is pointing (e.g., palm facing up). By examining an orientation of a limb relative to its parent limb and/or the torso, an axial roll angle may be determined. For example, if examining a lower leg, the orientation of the lower leg relative to the associated upper leg and hips may be examined in order to determine an axial roll angle.

FIGS. 9-10 illustrate screen shots of a user's movement to different locations within a field of view of a capture device while the user interacts with a video chat application executing in a computing device connected to the capture device and the resulting output of a video feed that is displayed to a remote user at a remote computing system. FIG. 9A is an exemplary illustration of a capture frame in a capture area captured by a capture device. The capture frame 902 includes a human target such as a user 18 and an object, such as a watch 906 in a first location in a capture area, 6 of the capture device. FIG. 9A also illustrates a sub-frame of pixels 904 that contains a position of the head, neck and shoulders of the user 18 in the capture frame, 902. FIG. 9B is an exemplary illustration of an output of a video feed that is displayed to a remote user via a display screen at a remote computing device. As illustrated in FIG. 9B, the sub-frame of pixels 904 is displayed to the remote user 17 via a display screen 912 of the remote computing device 198.

FIG. 9C is an exemplary illustration of a user's movement to a next location within the capture area. FIG. 9C illustrates a next capture frame 908 identifying the movement of the user 18 to a next location within the capture area 6. A next sub-frame of pixels 910 contains a position of the head, neck and shoulders in the next capture frame, 908. FIG. 9D is an exemplary illustration of an output of a video feed that is displayed to a remote user via a display screen at a remote computing device. As illustrated in FIG. 9D, the next sub-frame of pixels 910 is displayed to the remote user 17 via a display screen 912 in the remote computing device 198.

FIG. 10A is an exemplary illustration of more than one user detected in the capture frame 902 in the capture area, 6. As illustrated in FIG. 10A, the sub-frame of pixels 904 in the first capture frame 902 is automatically adjusted to include the users 18, 19 in the sub-frame of pixels 904. FIG. 10B is an exemplary illustration of an output of a video feed that is displayed to a remote user via a display screen at a remote computing device. As illustrated in FIG. 10B, the sub-frame of pixels 904 is displayed to the remote user 17 via a display screen 912 in the remote computing device 198. In another example, users 18, 19 may also be displayed in individual sub-frames 914, 916 to the remote user 17 at the remote computing system as illustrated in FIG. 10C.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

What is claimed is:

1. A method for automatically tracking movement of a user participating in a video chat application executing in a computing device, the method comprising:
receiving a capture frame comprising one or more depth images of a capture area from a depth camera connected to a computing device, the one or more depth images comprising pixels for one or more objects where each pixel has a depth value representing a distance to the one or more objects in the capture area from the depth camera;
determining if the capture frame includes a user in a first location in the capture area by analyzing edges of the capture frame by comparing the depth values associated with adjacent pixels of the capture frame;
identifying a sub-frame of pixels in the capture frame, the sub-frame of pixels including a position of a head, neck and shoulders of the user in the capture frame;
displaying the sub-frame of pixels including only the position of the head, neck and shoulders of the user to a remote user at a remote computing system;
automatically tracking the position of the head, neck and shoulders of the user to a next location within the capture area;
identifying a next sub-frame of pixels, the next sub-frame of pixels including a position of the head, neck and shoulders of the user in the next location, wherein the next sub-frame of pixels is included in a next capture frame of the capture area;

displaying the next sub-frame of pixels to the remote user in the remote computing system;

detecting and identifying more than one user in the capture area;

identifying individual sub-frames and next sub-frames of pixels for each of the more than one user, each of the individual sub-frames and next sub-frames including only the position of the head, neck and shoulders; and automatically adjusting the individual sub-frames of pixels or the individual next sub-frame of pixels to include the head, neck and shoulders of each of the users and displaying the individual sub-frame of pixels or the individual next sub-frame of pixels to the remote user, wherein each of the more than one user in the capture area is at a different location within the capture area.

2. The method of claim 1, wherein displaying the sub-frame of pixels and the next sub-frame of pixels to the remote user further comprises:
encoding the sub-frame of pixels and the next sub-frame of pixels into a video communication data stream to the remote user at the remote computing device.

3. The method of claim 1, wherein:
the size of the sub-frame of pixels in the capture frame is different from the size of the next sub-frame of pixels in the next capture frame.

4. The method of claim 1, wherein automatically tracking the position of the head, neck and shoulders of the user to a next location within the capture area further comprises:
automatically tracking lateral movement of the user to the next location in the capture area.

5. The method of claim 1, wherein automatically tracking the position of the head, neck and shoulders of the user to a next location within the capture area further comprises:
automatically tracking movement of the user to different distances from the capture device.

6. The method of claim 1, further comprising:
generating a skeletal model of the user based on the one or more depth images, wherein the head, neck and shoulders of the user is identified using the skeletal model.

7. The method of claim 1, further comprising:
determining if at least one of the sub-frame of pixels or the next sub-frame of pixels can include each of the users.

8. The method of claim 1, further comprising:
detecting and identifying more than one user in the capture area and identifying individual sub-frames of pixels to include each of the users such that each of the sub-frame of pixels or the next sub-frame of pixels are displayed as separately captured images.

9. The method of claim 7, further comprising:
identifying each of the users as a group of users in the sub-frame of pixels or the next sub-frame of pixels when the users are sufficiently close together, for a minimum period of time.

10. The method of claim 9, further comprising:
identifying the users in at least two individual sub-frames of pixels when the users are no longer sufficiently close together, for a minimum period of time.

11. One or more processor readable storage devices having processor readable code embodied on said one or more processor readable storage devices, the processor readable code for programming one or more processors to perform a method comprising:

receiving a capture frame comprising one or more depth images of a capture area from a depth camera connected to a computing device, the one or more depth images comprising pixels for one or more objects where each pixel has a depth value representing a distance to the one or more objects in the capture area from the depth camera, and where each pixel within determined edges is associated with each other to define the one or more objects in the capture area;

determining if the capture frame includes a user in a first location in the capture area by analyzing the edges of the capture frame by comparing the depth values associated with adjacent pixels of the capture frame, and when the depth values are greater than a predetermined edge tolerance, the pixels define the edge;

identifying a sub-frame of pixels in the capture frame, the sub-frame of pixels including a position of a head, neck and shoulders of the user in the capture frame;

displaying the sub-frame of pixels including the position of the head, neck and shoulders of the user to a remote user at a remote computing system;

receiving a next capture frame comprising one or more depth images of the capture area from a depth camera;

automatically tracking movement of one or more users within the capture area;

determining if the next capture frame includes the one or more users in a next location in the capture area based on the tracking;

identifying a next sub-frame of pixels containing the head, neck and shoulders of the one or more users in the next capture frame;

displaying the next sub-frame of pixels to the remote user at the remote computing system; and detecting and identifying two or more users in the capture area and identifying individual sub-frames of pixels to include each of the users such that each of the sub-frame of pixels or the next sub-frame of pixels are displayed as separately captured images.

12. One or more processor readable storage devices of claim 11, further comprising:
automatically centering the position of the head, neck and shoulders of the one or more users in the next sub-frame of pixels prior to the displaying.

13. One or more processor readable storage devices of claim 11, further comprising:
identifying the one or more users as a group of users in the next sub-frame of pixels when the one or more users are sufficiently close together, for a minimum period of time.

14. One or more processor readable storage devices of claim 13, further comprising:
automatically tracking movement of the group of users to a next location within the capture area by determining the position of the head, neck and shoulders of the group of users in the capture area.

15. One or more processor readable storage devices of claim 11, further comprising:
detecting and identifying two or more users in the capture area, determining if at least one of the sub-frame of pixels or the next sub-frame of pixels can include each of the users, automatically adjusting the sub-frame of pixels or the next sub-frame of pixels to include the head, neck and shoulders of each of the users and displaying the sub-frame of pixels or the next sub-frame of pixels to the remote user, wherein each of the two or more users in the capture area is at a different location within the capture area.

16. The method of claim 11, further comprising:
organizing the depth information including the depth image into layers that are perpendicular to a Z-axis extending from the depth camera along a line of sight to the user.

17. An apparatus for automatically tracking movement of one or more users participating in a video chat application, comprising:
a depth camera; and
a computing device connected to the depth camera to receive a capture frame comprising one or more depth images of a capture area, the one or more depth images comprising pixels for one or more objects where each pixel has a depth value representing a distance to the one or more objects in the capture area from the depth camera, and where each pixel within determined edges is associated with each other to define the one or more objects in the capture area, the computing device storing instructions, that when executed, perform:
determining if the capture frame includes a user in a first location in the capture area by analyzing the edges of the capture frame by comparing the depth values associated with adjacent pixels of the capture frame, and when the depth values are greater than a predetermined edge tolerance, the pixels define the edge;
identifying a sub-frame of pixels in the capture frame, the sub-frame of pixels including a position of a head, neck and shoulders of the user in the capture frame;
displaying the sub-frame of pixels including the position of the head, neck and shoulders of the user to a remote user at a remote computing system;
receiving a next capture frame comprising one or more depth images of the capture area from a depth camera;
automatically tracking movement of two or more users within the capture area;
determining if the next capture frame includes the two or more users in a next location in the capture area based on the tracking;
identifying a next sub-frame of pixels containing the head, neck and shoulders of the two or more users in the next capture frame;
and
displaying the next sub-frame of pixels including the two or more users to the remote user at the remote computing system.

18. The method of claim 6, wherein a width of a bitmask of the head, neck and shoulders of the two or more users is compared to a value of a predetermined width associated with a head, neck and shoulders of a body model of a human.

19. The method of claim 1, further comprising
automatically centering the position of the head, neck and shoulders of the user in the next sub-frame of pixels; and
automatically altering the size of the head, neck and shoulders of the user in the next sub-frame of pixels so that the size of the head, neck and shoulders of the user in the sub-frame of pixels and the next sub-frame of pixels is approximately constant.

20. The apparatus of claim 17, the computing device storing instructions, that when executed, further perform:
automatically centering the position of the head, neck and shoulders of the two or more users in the next sub-frame of pixels; and
automatically altering the size of the head, neck and shoulders of the two or more users in the next sub-frame of pixels so that the size of the head, neck and shoulders of the two or more users in the sub-frame of pixels and the next sub-frame of pixels is approximately constant.

* * * * *